United States Patent [19]

Suzuki et al.

[11] Patent Number: 4,736,010

[45] Date of Patent: Apr. 5, 1988

[54] EPOXY RESIN CURING COMPOSITION

[75] Inventors: Hiroshi Suzuki; Yutaka Asakawa, both of Tokyo, Japan

[73] Assignees: Asahi Denka Kogyo K.K.; A.C.R. Co., Ltd., both of Tokyo, Japan

[21] Appl. No.: 35,124

[22] Filed: Apr. 6, 1987

[30] Foreign Application Priority Data

May 21, 1986 [JP] Japan .................. 61-116721

[51] Int. Cl.$^4$ .............................................. C08G 59/44
[52] U.S. Cl. ..................... 528/103; 525/113; 525/504; 528/113; 528/341; 528/97; 528/99; 528/102
[58] Field of Search ................. 525/113, 329.3; 528/103, 113, 341, 111.3, 111.5, 97, 99, 102

[56] References Cited

U.S. PATENT DOCUMENTS

| | | | |
|---|---|---|---|
| 2,999,825 | 9/1961 | Floyd et al. | 528/111.5 |
| 3,635,860 | 1/1972 | Salensky | 525/111.5 X |
| 3,770,675 | 11/1973 | Taft | 525/111.5 |
| 4,338,225 | 7/1982 | Sheppard | 528/113 X |
| 4,507,411 | 3/1985 | Gordon et al. | 525/111.5 X |

Primary Examiner—Earl Nielsen
Attorney, Agent, or Firm—Flynn, Thiel, Boutell & Tanis

[57] ABSTRACT

An epoxy resin curing composition comprising a novel curing agent which is obtained by the amidation with elimination of alcohol between an adduct of a carboxyl-containing acrylonitrile-butadiene copolymer with an epoxidized fatty acid ester and an amide-forming nitrogenous compound. This composition exhibits improved adhesion involving peel strength to plastics, rubbers or flexible vinyl chloride resins and is excellent in mechanical strength and resistance to water and alkali and particularly to acid.

6 Claims, No Drawings

EPOXY RESIN CURING COMPOSITION

BACKGROUND OF THE INVENTION

1. Field of the Invention

The present invention relates to an epoxy resin curing composition comprising an epoxy compound and a novel amide compound modified with a carboxyl-containing acrylonitrilebutadiene copolymer.

2. Description of the Prior Art

Up to this time, polyamines, modified polyamines, amideamines, alicyclic polyamines, modified aromatic amines and Mannich bases of polyamines have been practically used as a room-temperature curing agent for epoxy resins. These curing agents disadvantageously give cured resins exhibiting poor peel strength and insufficient adhesion to various plastics, flexible vinyl chloride resins and rubbers, though having an excellent adhesion (tension shear strength) to metals and mortars.

Various studies on an improvement in adhesion to such adherends have been made up to this time. For example, a process comprising adding nylon 66 to an epoxy resin and a process comprising adding various rubbers, thermoplastics or polyurethane rubbers to an epoxy resin and/or the above curing agent or reacting the former with the latter have been proposed. However, though the cured resin compositions prepared by these processes exhibit improved adhesion, they exhibit such a poor resistance to water and chemicals disadvantageously that they can be used only in limited fields.

Recently, amide compounds comprising adducts of a terminal carboxyl-containing acrylonitrile-butadiene copolymer with N-aminoethylpiperazine have been developed and used as a curing agent for epoxy resins to give cured epoxy resin compositions having improved adhesion and improved flexibility. However, they are problematic because of high viscosity, high load and high cost and have a disadvantage in that remaining unreacted N-aminoethylpiperazine brings about toxicity to the skin and poor resistance to chemicals, particularly to acids.

Japanese Patent Laid-Open No. 179268/1982 discloses an epoxy resin adhesive composition excellent in peel strength which contains a polyamideamine containing a diene copolymer component in its molecule. Further, it is described in one Example thereof that the use of an adduct of a carboxyl-terminated acrylonitrile-butadiene copolymer with polyamideamine gave an adhesive composition having improved adhesion, particularly peel strength. However, though this adhesive composition exhibits improved adhesion as compared with the composition containing polyamides according to the prior art, the acid resistance thereof is so poor that it can be used only in limited fields. The reason of this poor acid resistance is thought to be as follows: The amide-forming reaction between a carboxyl-containing acrylonitrile-butadiene copolymer and a primary amine is restricted by the steric hindrance of the nitrile group of the copolymer to the carboxyl group thereof, so that amine salts of —COOH/NH$_2$ remain in the reaction product, thus remarkably lowering the characteristics, particularly acid resistance, of the epoxy resin composition cured with the product.

Therefore, development of an epoxy resin curing composition, the peel strength of which is improved without detriment to water resistance, chemical resistance, mechanical strength and the like has been expected.

SUMMARY OF THE INVENTION

The epoxy resin curing composition according to the present invention essentially comprises:

[I] an epoxy compound having more than one vicinal epoxy group in its molecule on the average, and

[II] a modified fatty acid amide compound containing a bonded acrylonitrile-butadiene copolymer which is obtained by the amidation with elimination of alcohol between (c) an adduct obtained by reacting (a) a carboxyl-containing acrylonitrile-butadiene copolymer with (b) an epoxidized fatty acid ester having more than 0.5 epoxy group and more than 0.5 ester group respectively on the average at an equivalent ratio of the carboxyl group to the epoxy group of between 1:0.5 and 1:2.0 and (d) one or more amide-forming nitrogenous compound.

In the invention, a curable composition to obtain an epoxy resin therefrom is in other words defined to comprise (I) an epoxy compound having more than one vicinal epoxy group on the average in the molecule and (II) an amide compound modified with an acrylonitrile-butadiene copolymer fatty acid ester, obtained by reacting (a) a carboxyl group-containing acrylonitrile-butadiene copolymer with (b) an epoxidized fatty acid ester having more than 0.5 epoxy group on the average and more than 0.5 ester group on the average, at an equivalent ratio of the carboxyl group of (a) to the epoxy group of (b) in the range between 1:0.5 and 1:2.0 to obtain (c) an adduct of (a) and (b), and further reacting the adduct (c) with (d) a nitrogen-containing compound to form the amide compound.

It is preferred that the reaction between the adduct (c) and the nitrogen-containing compound (d) is effected at an equivalent ratio of the carboxyl group of (c) to the amino group of (d) in the range of one or smaller, more preferably between 1 and 1/500, most preferably between 1 and 1/200.

It is also preferably that the modified amide compound (II) contains 3 to 95 percent by weight of the portion of the acrylonitrile-butadiene copolymer.

It is further preferred that said (b) is an alkyl ester of an epoxidized fatty acid having 8 to 22 carbon atoms, the alkyl having 1 to 4 carbon atoms.

The composition according to the present invention is characterized by comprising a modified amide compound which is prepared by a process which comprises reacting carboxyl groups of an epoxidized fatty acid ester to obtain a modified fatty acid ester and reacting the obtained ester with an amino-containing compound to thereby enhance the degree of amide bond formation. The epoxy resin curing composition comprising the modified amide and an epoxy compound according to the present invention exhibits not only enhanced peel strength to metals but also remarkably enhanced adhesion to plastics, rubbers and flexible vinyl chloride resins, and has excellent mechanical strength, water resistance and alkali resistance and particularly remarkably improved acid resistance as compared with compositions comprising amides modified with an acrylonitrilebutadiene copolymer according to the prior art.

Detailed Description of Preferred Embodiments

Preferred examples of the epoxy compound [I] to be used in the present invention include:

(I-1) epoxy resins having more than one substitued or unsubstituted glycidyl ether group in its molecule on the average and represented by the general formula:

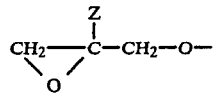

wherein Z stands for a hydrogen atom or a methyl or ethyl group, (I-2) epoxy resins having more than one substituted or unsubstituted glycidyl ester group in its molecule on the average and represented by the general formula:

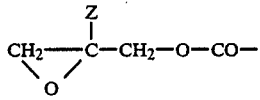

wherein Z stands for a hydrogen atom or a methyl or ethyl group, and (I-3) epoxy resins having more than one substituted or unsubstituted 1,2-epoxypropyl group in its molecule on the average and represented by the general formula:

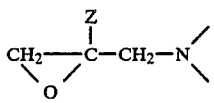

wherein Z stands for a hydrogen atom or a methyl or ethyl group.

Among them, epoxy resins having an epoxy equivalent of 180 to 500 are particularly preferred as the epoxy compound [I].

Examples of the above epoxy resin having more than one substituted or unsubstituted glycidyl ether group in its molecule (I-1) include epoxy resins having glycidyl ether groups derived from phenolic hydroxyl groups and ones having glycidyl ether groups derived from alcoholic hydroxyl groups. Particularly preferred examples of the resin (I-1) include (I-1-1) polyglycidyl ethers of polyhydric phenolds having one or more aromatic nuclei and (I-1-2) polyglycidyl ethers of alcoholic polyhydroxyl compounds derived by the addition of an alkylene oxide having 2 to 4 carbon atoms to polyhydric phenols having one or more aromatic nuclei.

Examples of the polyglycidyl ether (I-1-1) include epoxy resins comprising polyglycidyl ether as a main component which are obtained by reacting (A) a polyhydric phenol having at least one aromatic nucleus with (B) an epihalohydrin in the presence of a basic catalyst such as sodium hydroxide or a basic compound in a reaction equivalent amount according to an ordinary process; epoxy resins which are obtained by reacting (A) a polyhydric phenol having at least one aromatic nucleus with (B) an epihalohydrin in the presence of an acid catalyst such as boron trifluoride according to an ordinary process to obtain a polyhalohydrin ether and reacting the polyhalohydrin ether with a basic compound such as sodium hydroxide and epoxy resins which are obtained by reacting (A) a polyhydric phenol having at least one aromatic nucleus with an epihalohydrin in the presence of a catalytic amount of a basic catalyst such as triethylamine according to an ordinary process to obtain a polyhalohydrin ether and reacting the polyhalohydrin ether with a basic compound such as sodium hydroxide.

Examples of the polyglycidyl ether (I-1-2) include epoxy resins comprising polyglycidyl ether as a main component which are obtained by reacting (D) a polyhydroxyl compound derived by the addition of an alkylene oxide having 2 to 4 carbon atoms to a polyhydric phenol having at least one aromatic nucleus with (B) an epihalohydrin in the presence of a catalytic amount of an acid catalyst such as boron trifluoride to obtain a polyhalohydrin ether and reacting the polyhalohydrin ether with a basic compound such as sodium hydroxide.

Examples of the polyhydric phenol having at least one aromatic nucleus (A) include (A-1) mononuclear polyhydric phenols having one aromatic nucleus and (A-2) polynuclear polyhydric phenols havig at least two aromatic nuclei.

Examples of the mononuclear polyhydric phenol (A-1) include resorcinol, hydroquinone, pyrocatechol, phloroglycinol, 1,5-dihydroxynaphthalene, 2,7-dihydroxynaphthalene and 2,6-dihydroxynaphthalene.

Examples of the polynuclear polyhydric phenol (A-2) include polynuclear dihydric phenols represented by the general formula:

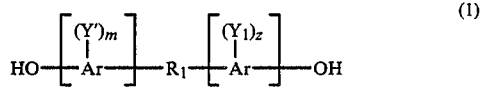 (1)

wherein Ar stands for an aromatic divalent hydrocarbyl group such as naphthylene or phenylene, among which a phenylene group is preferred for the object of the present invention; Y' and $Y_1$ may be the same or different from each other and each stands for an alkyl group, preferably having at most 4 carbon atoms, such as methyl, n-propyl, n-butyl, n-hexyl or n-octyl group, a halogen atom such as a chlorine, bromine, iodine or fluorine atom or an alkoxy group, preferably having at most 4 carbon atoms, such as methoxy, methoxymethyl, ethoxy, ethoxyethyl, n-butoxy or amyloxy group, provided that when either or both of the above aromatic divalent hydrocarbyl groups has further other substituent in addition to the hydroxyl group, these substituents may be the same or different from each other; m and z may be the same or different from each other and are each an integer of 0 to the maximum value corresponding to the number of hydrogen atoms of the aromatic ring (Ar) which can be replaced with a substituent; $R_1$ stands for

—O—, —S—, —SO—, —SO₂— or a divalent hydrocarbyl group such as an alkylene group (for example, methylene, ethylene, trimethylene, tetramethylene, pentamethylene, hexamethylene, 2-ethylhexamethylene, octamethylene, nonamethylene or decamethylene), an alkylidene group (for example, ethylidene, propylidene, isopropylidene, isobutylidene, amylidene, isoamylidene or 1-phenylethylidene), an alicyclic group (for example, 1,4-cyclohexylene, 1,3-cyclohexylene or cyclohexylidene), a halogenated alkylene, alkylidene or alicyclic group, an alkoxyor aryloxy-substituted alkylidene group or an alkoxy- or aryloxy-substituted alkylene or alicyclic group [for example, methoxymethylene, ethoxymethylene, ethoxyethylene, 2-ethoxytrimethylene, 3-ethoxypentamethylene, 1,4-(2-methoxycyclohexane), phenoxyethylene, 2-phenoxytrimethylene or 1,3-(2-phenoxycyclohexane) group], or an alkylene group (for example, phenylethylene, 2-phenyltrimethylene 1, 7-phenylpnetamethylene or 2-phenyldecamethylene), an aromatic group (for example, phenylene or naphthylene), a halogenated aromatic group [for example, 1,4-(2-chlorophenylene), 1,4-(2-bromophenylene) or 1,4-(2-fluroophenylene)], an alkoxy- or aryloxysubstituted aromatic group [for example, 1,4-(2-methoxyphenylene), 1,4-(2-ethoxyphenylene), 1,4-(2-n-propoxphenylene), or 1,4-(2-phenoxyphenylene)] or an alkyl-substituted aromatic group [for example, 1,4-(2-methylphenylene), 1,4-(2-ethylphenylene), 1,4-(2-n-propylphenylene), 1,4-(2-n-butylphenylene) or 1,4-(2-n-dodecylphenylene)], or alternatively, R₁ may be a ring fused to one of the above Ar groups like the case of a compound represented by the formula:

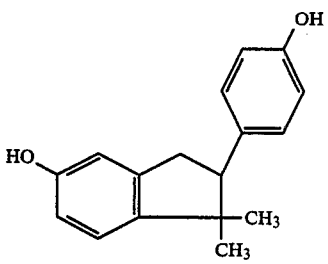

a polyalkoxy group (tor example, polyethoxy, polypropoxy, polythioethoxy, polybutoxy or polyphenylethoxy group), a silicon-containing group (for example, polydimethylsiloxy, polydiphenylsiloxy or polymethylphenylsiloxy group) or a group comprising two or more alkylene or alkylidene groups which are interrupted by an aromatic ring, a tertiary amino group, an ether bond, a carboxyl group or a sulfur-containing bond (for example, sulfur or sulfoxide).

Among these polynuclear dihydric phenols, ones represented by the general formula:

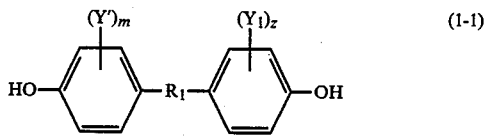

wherein Y' and Y₁ are each as defined above, m and z are each 0 to 4 and R₁ is an alkylene group, preferably having 1 to 3 carbon atoms, an alkylidene group or a saturated group represented by the formula:

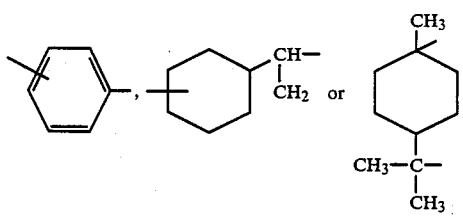

are particularly preferred.

Examples of the polynuclear dihydric phenol represented by the general formula (1-1) include bis-hydroxyphenyl-alkanes such as 2,2-bis-(p-hydroxyphenyl)-propane (commercially available under the trade name of "bisphenol-A"), 2,4'-dihydroxydiphenylmethane, bis-(2-hydroxphenyl)-methane, bis-(4-hydroxyphenyl)-methane, bis-(4-hydroxy-2, 6-dimethyl-3-methoxyphenyl)-methane, 1,1-bis-(4-hydroxyphenyl)-ethane, 1,2-bis-(4-hydroxyphenyl)-ethane, 1,1-bis-(4-hydroxy-2-chlorophenyl)-ethane, 1,1-bis-(3,5-dimethyl-4-hydroxyphenyl)-ethane, ethane, 1,3-bis-(3-methyl-4-hydroxyphenyl)-propane, 2,2-bis-(3,5-dichloro-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(3-isopropyl-4-hydroxyphenyl)-propane, 2,2-bis-(4-hydroxynaphthyl)propane, 2,2-bis-(4-hydroxyphenyl)-pentane, 3,3-bis-(4-hydroxyphenyl)-pentane, 2,2-bis-(4-hydroxyphenyl)heptane, bis-(4-hydroxyphenyl)-methane, bis-(4-hydroxyphenyl)-cyclohexylemthane, 1,2-bis-(4-hydroxyphenyl)-1,2-bis-(phenyl)-propane and 2,2-bis-(4-hydroxyphenyl)-1-phenyl-propane; dihydroxybiphenyls such as 4,4'-dihydroxybiphenyl, 2,2'-dihydroxybiphenyl anad 2,4'-dihydroxybiphenyl; di-(hydroxphenyl) sulfones such as bis-(4-hydroxyphenyl) sulfone, 2,4'-dihydroxydiphenyl sulfone, chloro-2,4-dihydroxydiphenyl sulfone, 5-chloro-4,4'-dihydroxydiphenyl sulfone and 3'-chloro-4,4'-dihydroxydiphenyl sulfone and di-(hydroxyphenyl) ethers such as bis-(4-hydroxhenyl) ether, 4,3'-(or 4,2'- or 2,2'-dihydroxydiphenyl) ehter, 4,4'-dihydroxy-2,6-dimethyldiphenyl ether, bis-(4-hydroxy-3-isobutylphenyl) ether, bis-(4-hydroxy-3-isopropylphenyl) ether, bis-(4-hydroxy-3-chlorophenyl) ether, bis-(4-hydroxy-3-fluorophenyl) ether, bis-(4-hydroxy-3-bromophenyl) ether, bis-(4-hydroxynaphthyl) ether, bis-(4-hydroxy-3-chloronaphthyl) ether, bis-(2-hydroxybiphenyl) ether, 4,4'-dihydroxy-2,6-dimethoxydiphenyl ether and 4,4'-dihydroxy-2,5-diethoxydiphenyl ether. Further, 1,1-bis-(4-hydroxyphenyl)-2-phenylethane, 1,3,3-trimethyl-1-(4-hydroxyphenyl)-6-hydroxyindane and 2,4-bis-(p-hydroxyphenyl)-4-methylpentane are suitable.

Other preferred examples of the polynuclear dihydric phenol are ones represented by the general formula:

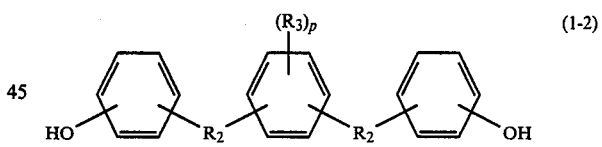

wherein R₃ stands for a methyl or ethyl group, R₂ stands for an alkylidene group having 1 to 9 carbon atoms or another alkylene group and p is 0 to 4, such as 1,4-bis-(4-hydroxybenzyl)-benzene, 1,4-bis-(4-hydroxybenzyl)-tetramethylbenzene, 1,4,bis-(4-hydroxybenzyl)-tetramethylbenzene, 1,4-bis-(4-hydroxybenzyl)-tetraethylbenzene, 1,4-bis-(p-hydroxycumyl)-benzene and 1,3-bis-(p-hydroxycumyl)-benzene.

Other examples of the polynuclear polyhydric phenol (A-2) include precondensated between phenols and carbonyl compounds (for example, phenolic resin precondensates, phenol-acrolein condensates, phenolglyoxal condensates, phenol-pentanediallyl condensates, resorcinol-acetone condensates and xylene-phenol-formalin precondensates) and condensates between phenols and polychloromethylated aromatic compounds (for example, condensates between phenol and bischloromethylxylene).

The above polyhydroxyl compound (D) is a compound which is prepared by reacting (A) the above polyhydric phenol having at least one aromatic nucleus with an alkylene oxide in the presence of a catalyst which can promote the reaction between a hydroxyl group and an epoxy group and has an atomic group of —ROH (wherein R is an alkylene group derived from the alkylene oxide) and/or —(RO)$_n$H (wherein R is an alkylene group derived from the alkylene groups different from each other and n is an integer of 2 or omre which stands for a degree of polymerization for an oxyalkylene group) which is bonded to the phenol residue via an ether bond. Although the reaction between the polyhydric phenol (A) and an alkylene oxide may be carried out at a molar ratio of the latter to the former of at least 1, the equivalent ratio of an alkylene oxide to the hydroxyl group of the polyhydric phenol (A) is preferably from 1 to 10, still preferably from 1 to 3.

Although examples of the above alkylene oxide include ethylene oxide, propylene oxide and butylene oxide, an alkylene oxide which is reacted with the polyhydric phenol (A) to give a side chain as well as an ether bond is particularly preferred. Examples of such an alkylene oxide include propylene oxide, 1,2-butylene oxde and 2,3-butylene oxide, among which propylene oxide is particularly preferred.

Particularly preferred examples of the polyhydroxyl compound (D) include ones represented by the general formula:

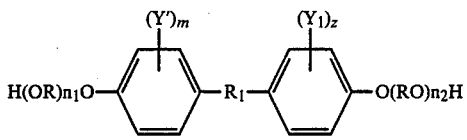

wherein Y', Y$_1$, m, z and R$_1$ are as defined above with respect to the general formula (1-1), R is an alkylene group having 2 to 4 carbon toms and n$_1$ and n$_2$ are each from 1 to 3.

Other preferred examples of the polyhydroxyl compound (D) include ones represented by the general formula:

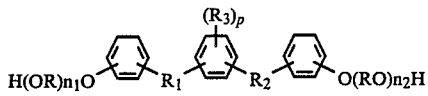

wherein R$_1$, R$_2$ and R$_3$ are as defined above with respect to the general formula (1-2), R is an alkylene group having 2 to 4 carbon atoms and n$_1$ and n$_2$ are each from 1 to 3.

The epihalohydrin (B) is a compound represented by the general formula:

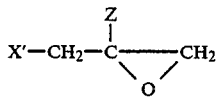 (2)

wherein Z is a hydrogen atom, a methyl or ethyl group and X' is a hydrogen atom, and examples thereof include epichlorohydrin, epibromohydrin, 1,2-epoxy-2-methyl-3-chloropropane and 1,2-epoxy-2-ethyl-3-chloropropane.

The acid catalyst promoting the reaction between the above epihalohydrin (B) and the polyhydric phenol (A) or the polyhydroxyl compound (D) may be a Lewis acid such as boron trifluoride, stannic chloride, zinc chloride or ferric chloride, a derivative thereof exhibiting an action similar to that of Lewis acid such as boron trifluoride-ether complex or a mixture thereof.

On the other hand, the basic catalyst promoting the reaction between the epihalohydrin (B) and the polyhydric phenol (A) may be alkali metal hydroxides (for example, sodium hydroxide), alkali metal alcoholates (for example, sodium ethylate), tertiary amines (for example, triethylamine or triethanolamine), quaternary ammonium compounds (for example, tetramethylammonium bromide) or their mixtures. The glycidyl ether to be used as an epoxy compound in the present invention may be prepared either by the reaction between the epihalohydrin (B) and the polyhydric phenol (A) directly or by dehydrohalogenating (ring-closing) a halohydrin ether obtained by the reaction in the presence of a basic compound. Suitable examples of the basic compound include alkali metal hydroxides (for example, sodium hydroxide) and alkali metal aluminates (sodium aluminate).

Of course, the above catalyst or the basic compound can be used either as such or as a solution thereof in an inorganic or organic solvent.

The epoxy resin having more than one substituted or unsubstituted glycidyl ester group in its molecule on the average (I-2) may be a polyglycidyl ester of an aliphatic or aromatic polycarboxylic acid or the like and examples thereof include epoxy resins obtained by polymerizing glycidyl methacrylate synthesized by the reaction of the epihalohydrin (B) of the general formula (2) with methacrylic acid.

Examples of the epoxy resin having more than one substituted or unsubstituted 1,2-epoxypropyl group in its molecule on the average (I-3) include epoxy resins obtained by the reaction of aromatic amines (for example, aniline or aniline derivatives having an alkyl substituent on the nucleus) with the epihalohydrin (B) represented by the general formula (2) and epoxy resins obtained by the reaction of precondensates between an aromatic amine and an aldehydes (for example, aniline-formaldehyde precondensate or aliline-phenolformaldehyde precondensate) with the epihalohydrins (B).

Other various known epoxy resins having vicinal epoxy groups such as ones described in "Epokishi-Jushi no Seizo to Oyo (Production and Application of Epoxy Resins)", edited by Hiroshi Kakinouchi, may be also used.

Preferred examples of the carboxyl-containing acrylonitrile-butadiene copolymer (a) to be used in the present invention include Hycar CTBN having terminal carboxyl groups (a product of B. F. Goodrich), Nipol DN-601 and Nipol 1072 both having terminal or pendant carboxyl groups (products of The Japanese Geon Co.), and conjugated adducts of acrylonitrile-butadiene copolymer with meleic acid.

The acrylonitirle-butadiene copolymer to be used in the present invention has an average molecular weight of preferably 2,000 to 20,000, still preferably 3,000 to 8,000 and a carboxyl equivalent of preferably 1,000 to 7,000, still preferably 1,200 to 3,000.

An acrylonitrile-butadiene copolymer having a high molecular weight exceeding the above range is solid and therefore is poor in compatibility with or solubility in the modifier, i.e., epoxidized fatty acid ester, amine, solvent or the epoxy resin, thus being unfavorable in terms of operability.

Preferred examples of the epoxidized fatty acid ester (b) include alkyl esters of epoxidized fatty acid such as epoxidized stearic or oleic acid (wherein said alkyl has preferably 1 to 4 carbon atoms) and epoxidized fatty acid esters containing these esters. Specifically, butyl ester of epoxidized linseed oil fatty acid, methyl ester of epoxidized rice bran oil fatty acid and butyl ester of epoxidized soybean oil fatty acid are preferably used.

The amide-forming nitrogenous compound (d) may be a compound having an active hydrogen atom bonded to a nitrogen atom or a compound which can react similarly to such a compound under the reaction conditions and examples thereof include polyamines, amideamines and polyamides. Examples of the polyamine include aliphatic polyamines such as ethylene diamine, hexamethylenediamine, tetraethylenetriamine, undecamethylenediamine, tetrakis (2-aminoethylaminomethyl) methane and triethylene-bis(-trimethylene) hexamine; alicyclic polyamines such as isopropylidenebiscyclohexylamine, menthanediamine and isophoronediamine; heterocyclic polyamines such as bis(3-aminopropyl) piperazine and Epomate (a product of Mitsubishi Petrochemical Co., Ltd.) and aromatic polyamines such as o-xylylenediamine, m-xylylenediamine and p-xylylenediamine. Further, modified amines obtained by modifying the above amines, for example, epoxy adduct thereof, acrylonitrile adduct thereof or Mannich bases thereof with phenol or carbonyl compounds can be also used.

Various amides obtained by the condensation of the above polyamines with a monomer or dimer acid can be used as the above amideamine or polyamide. Particular exampels of teh amideamine or polyamide include ACR Hardener H-280 (a product of ACR) and ACR Hardener H-285 (a product of ACR).

The reaction of the carboxyl-containing acrylonitrilebutadiene copolymer (a) with the epoxidized fatty acid ester (b) is carried out at an equivalent ratio of the carboxyl group to the epoxy group of between 1:0.5 anad 1:2.0, preferably 1:0.7 and a reaction temperature of 80° to 180° C., preferably 100° to 160° C. for 1 to 10 hours, preferably 2 to 6 hours until the acid value approaches 0.

An excess epoxy group is reacted with an amino compound in the following reaction to form an epoxy-amine adduct, thus being comsumed.

The reaction between (c) the modified fatty acid ester containing acrylonitrile-butadiene copolymer in its molecule which is obtained by the reaction of the carboxyl-containing acrylonitrile-butadiene copolymer (a) with the epoxidized fatty acid ester (b) and (d) an amide-forming nitrogenous compound is carried out at an equivalent ratio of the amino group to the carboxyl group of 1 or more.

The amidation with elimination of alcohol is carried out according to an ordinary process at a temperature of generally 120° to 220° C., preferably 130° to 180° C., for 2 to 10 hours, preferably 3 to 6 hours, while removing alcohol under normal or reduced pressure.

The modified fatty acid amide compound containing bonded acrylonitrile-butadiene copolymer [II] thus obtained may be further modified by an ordinary curing agent-modifying process. For example, it may be further reacted with a monomer or dimer acid. Alternatively, a mixture of the adduct of epoxidized fatty acid ester with acrylonitrile-butadiene copolymer (c) with a monomer or dimer acid may be reacted with an amine compound.

It is preferred that the acrylonitrile-butadiene copolymer content of the curing agent according to the present invention is 3 to 95% by weight, still preferably 5 to 80% by weight.

If the content is less than 3% by weight, improvement in adhesion, particularly peel strength, will be insufficient, while if it is more than 95% by weight, the viscosity of the curing agent will be so high that the cured resin will exhibit too high an elasticity to attain the objective improvement of the present invention sufficiently.

Although the ratio of the epoxy resin [I] to the modified amide compound (curing agent) [II] of the epoxy resin curing composition according to the present invention is not particularly limited, it is preferably between 2:1 and 1:6.

If necessary, the epoxy resin curing composition according to the present invention may further contain other additives such as silica powder, bituminous substance, cellulose, glass fiber, clay, mica, aluminum powder aerogel, talc, bentonite, calcium carbonate or their analogs.

It is a matter of course that the composition according to the present invention can contain both the above reaction product [II] and an ordinary curing agent according to the prior art as a curing agent. Further, if necessary, the composition according to the present invention may contain a diluent, flame retardant or the like.

[EXAMPLE]

The present invention will be described in more detail by the following Examples, though it is not limited by them.

PREPARATIVE EXAMPLE 1

A mixture comprising 150 g of a carboxyl-terminated acrylonitrile-butadiene copolymer (Hycar CTBN 1300 X 8; a product of B. F. Goodrich), 25 g of butyl ester of epoxidized linseed oil fatty acid having an epoxy equivalent of 210 and 0.5 g of triphenylphosphine was kept at 140° C. for 5 hours to carry out the addition. 350 g of polyamideamine (amine value: 400, ACR Hardener H-285) was added to the reaction mixture. The resulting mixture was kept at 180° C. for 3 hours, while removing butanol, thus carrying out the amidation. A product [A] was obtained.

| Reaction product [A]: | viscosity | 4,600 cP |
|---|---|---|
| | amine value | 346 |

PREPARATIVE EXAMPLE 2

A mixture comprising 300 g of a carboxyl-terminated acrylonitrile-butadiene copolymer (Hycar CTBN 1300 X 8; a product of B. F. Goodrich), 75 g of emthyl ester of epoxidized rice bran oil fatty acid having an epoxy equivalent of 450 and 1.0 g of triphenylphosphine was kept at 140° C. for 6 hours to carry out the addition. 1,875 g of polyamideamine (amine value: 400, ACR Hardener H-285) was added to the reaction mixture. The resulting mixture was kept at 180° C. for 3 hours, while removing methanol, thus carrying out the amidation. A reaction product [B] was obtained.

| Reaction product [B]: | viscosity at 25° C. | 4,000 cP |
|---|---|---|

| | |
|---|---|
| amine value | 340 |

PREPARATIVE EXAMPLE 3

A mixture comprising 300 g of a carboxyl-containing acrylonitrile-butadiene copolymer (a product of The Japanese Geon Co.; DN-601), 50 g of butyl ester of epoxidized linseed oil fatty acid and 0.5 g of triethanolamine was kept at 150° C. for 5 hours to carry out the addition. 1,750 g of an amideamine (amine value: 320, ACR Hardener H-280) was added to the reaction mixture. The resulting mixture was kept at 180° C. for 3 hours, while removing butanol, thus carrying out the amidation. A reaction product [C] was obtained.

PREPARATIVE EXAMPLE 4

A mixture comprising 422 g of a carboxyl-terminated acrylonitrile-butadiene copolymer (Hycar CTBN 1300 X 8; a product of B. F. Goodrich), 53.9 g of butyl ester of epoxidized linseed oil fatty acid and 0.7 g of triethanolamine was kept at 140° C. for 10 hours to carry out the addition. After the completion of the addition, 37 g of N-aminoethylpiperazine was added to the reaction mixture. The resulting mixture was kept at 180° C. for 3 hours, while removing butanol, thus carrying out the amidation. A reaction product [D] was obtained.

COMPARATIVE CURING AGENT 1

Polyamideamine (amine value: 310, viscosity at 25° C.: 80P, ACR Hardener H-280, a product of ACR).

PREPARATION OF COMPARATIVE CURING AGENT 2

A mixture comprising 510 g of a dimer acid, 200 g of tall oil fatty acid and 380 g of tetraethylenepentamine was kept at 190° C. in a nitrogen atmosphere for 3 hours, while removing water, thus carrying out the amidation. After the reaction mixture was cooled to 90° C., 130 g of a carboxyl-terminated acrylonitrile-butadiene copolymer (Hycar CTBN 1300 X 8; a product of B. F. Goodrich) was added thereto. The resulting mixture was kept at 185° C. for 3 hours to carry out the amidation. Thus comparative curing agent [2] was obtained.

| Comparative curing agent [2]: | viscosity at 40° C. | 10 P |
|---|---|---|
| | amine value | 271 |

COMPARATIVE CURING AGENT [3]

Hycar ATBN 1300 X 16 (viscosity: 225,000cP, amine equivalent: 900, a product of B. F. Goodrich).

EXAMPLES 1 TO 3 AND COMPARATIVE EXAMPLES 1 AND 2

An epoxy resin of bisphenol-A type was added to the curing agents [A] to [C] prepared in Preparative Examples 1 to 3 and the Comparative curing agents [1] and [2] each in a ratio given in Table 1. The obtained mixtures were each cured at a room temperature over a period of 10 days. Physical properties of the cured resins are also shown in Table 1.

TABLE 1

| | | Example | | | Comparative Example | |
|---|---|---|---|---|---|---|
| | | 1 | 2 | 3 | 1 | 2 |
| Raw material | Adeka Resin EP-4100[1] (parts by weight) | 100 | 100 | 100 | 100 | 100 |
| | Product [A] (parts by weight) | 60 | — | — | — | — |
| | Product [B] (parts by weight) | — | 60 | — | — | — |
| | Product [C] (parts by weight) | — | — | 60 | — | — |
| | Comparative curing agent [1] (parts by weight) | — | — | — | 60 | — |
| | Comparative curing agent [2] (parts by weight) | — | — | — | — | 80 |
| Physical properties | Shore hardness (D) | 84 | 82 | 81 | 83 | 80 |
| | Adhesive strength | | | | | |
| | T-peel strength (kg/inch) | 5.9 | 6.8 | 4.7 | 1.5 | 3.8 |
| | tensile shear strength (kg/cm$^2$) | | | | | |
| | steel plate (1 mm thick) | 192 | 203 | 190 | 161 | 170 |
| | acryl (1 mm thick) | 55 | 43 | 20 | 13 | 16 |
| | rigid PVC (1 mm thick) | 52 | 35 | 24 | 16 | 23 |
| | polycarbonate (1 mm thick) | 44 | 40 | 20 | 15 | 18 |
| | ABS (1 mm thick) | 18 | 17 | 16 | 15 | 16 |
| | 180° peel test (kg/inch) | | | | | |
| | cement mortar/flexible PVC sheet | destruction of substrate | destruction of substrate | destruction of substrate | 1.0 | destruction of substrate |
| | flexible PVC sheet/flexible PVC sheet | destruction of substrate | destruction of substrate | destruction of substrate | 0.5 | destruction of substrate |
| | Water absorption[2] (%) | | | | | |
| | water | 1.3 | 1.2 | 1.1 | 1.3 | 1.5 |
| | 10% NaOH | 1.4 | 1.4 | 1.3 | 1.5 | 1.6 |
| | 10% HCl | 1.7 | 1.8 | 1.5 | 1.8 | 4.0 |

[1]epoxy resin of bisphenol-A type (epoxy equivalent: 190, viscosity at 25° C.: 110P)
[2]rate of weight change after immersion for 7 days

EXAMPLE 4 AND COMPARATIVE EXAMPLE 3

An epoxy resin of bisphenol-A type was added to the product [D] obtained in Preparative Example 4 and Comparative curing agent [3] each in a ratio given in Table 2. The obtained mixtures were each cured at a room temperature over a period of 20 days. Physical properties of the cured resins are also shown in Table 2.

TABLE 2

| | | Ex. 4 | Comp. Ex. 3 |
|---|---|---|---|
| Raw material (parts by weight) | Adeka Resin EP-4100 | 100 | 100 |
| | Product [D] | 500 | — |
| | Comparative curing agent [3] | — | 500 |

TABLE 2-continued

|  |  | Ex. 4 | Comp. Ex. 3 |
|---|---|---|---|
| Physical properties | Shore hardness (A) | 65 | 80 |
|  | tensile strength (kg/cm$^2$) | 43 | 90 |
|  | elongation (%) | 318 | 98 |
|  | water absorption[1] |  |  |
|  | water (%) | 1.8 | 2.7 |
|  | 10% HCl (%) | 3.2 | 5.9 |

[1]rate of weight change after immersion for 10 days

What is claimed is:

1. A curable composition for an epoxy resin, which comprises
(I) an epoxy compound having more than one vicinal epoxy groups on the average in the molecule and
(II) an amide compound modified with an acrylonitrile-butadiene copolymer fatty acid ester, obtained by reacting (a) a carboxyl group-containing acrylonitrile-butadiene copolymer with (b) an epoxidized fatty acid ester having more than 0.5 epoxy group on the average and more than 0.5 ester group on the average, at an equivalent ratio of the carboxyl group of (a) to the epoxy group of (b) in the range between 1:0.5 and 1:2.0 to obtain (c) an adduct of (a) and (b), and further reacting the adduct (c) with (d) a nitrogen-containing compound to form the amide compound.

2. A composition as claimed in claim 1, in which the carboxyl group-containing acrylonitrile-butadiene copolymer (a) has an average molecular weight of 2,000 to 20,000.

3. A composition as claimed in claim 1, in which the reaction between the adduct (c) and the nitrogen-containing compound (d) is effected at an equivalent ratio of the carboxyl group of (c) to the amino group of (d) in the range between 1 and 1/500.

4. A composition as claimed in claim 1, in which the modified amide compound (II) contains 3 to 95 percent by weight of the portion of the acrylonitrile-butadiene copolymer.

5. A composition as claimed in claim 1, which comprises (I) and (II) at a weight ratio of 2:1 to 1:6.

6. A composition as claimed in claim 1, which said (b) is an alkyl ester of an epoxidized fatty acid having 8 to 22 carbon atoms, the alkyl having 1 to 4 carbon atoms.

* * * * *

UNITED STATES PATENT AND TRADEMARK OFFICE
CERTIFICATE OF CORRECTION

PATENT NO. : 4 736 010

DATED : April 5, 1988

INVENTOR(S) : Hiroshi SUZUKI et al

It is certified that error appears in the above-identified patent and that said Letters Patent is hereby corrected as shown below:

Column 13, Line 15; Change "groups" to ---group---.

Column 14, Line 20; After "Claim 1," insert ---in---.

Signed and Sealed this

Twenty-fifth Day of October, 1988

Attest:

DONALD J. QUIGG

*Attesting Officer*  *Commissioner of Patents and Trademarks*